Patented Apr. 15, 1947

2,418,923

UNITED STATES PATENT OFFICE 2,418,923

5-KETO-2,4,6,8-TETRAHYDROIMIDAZOLO [4,5-C] THIOPHENES AND PROCESS FOR PREPARING THE SAME

Seymour Bernstein, Pearl River, Bernard R. Baker, Nanuet, and Sidney R. Safir, Pearl River, N. Y., assignors by mesne assignments, to American Cyanamid Company, New York, N. Y., a corporation of Maine No Drawing. Application February 14, 1945, Serial No. 577,943

9 Claims. (Cl. 260—309)

1

This invention relates to new organic compounds and to methods of their preparation. More particularly, the invention relates to the preparation of 5-keto-2,4,6,8-tetrahydroimidazolo-[4,5-c] thiophenes and reaction products thereof.

We have found that when an acid addition salt of a 3-amino-4-keto-thiophane is mixed with cyanic acid, or a salt of cyanic acid, in an appropriate solvent, a 5-keto-2,4,6,8-tetrahydroimidazolo-[4,5-c] thiophene is obtained. This reaction may be illustrated by the following equation:

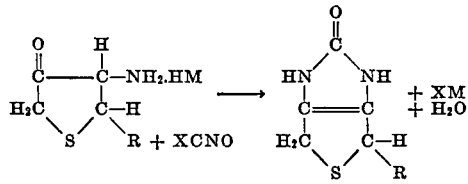

wherein R is an alkyl radical, an ω-carboxyalkyl radical or an ω-carbalkoxyalkyl radical, M is the anion of an acid, and X is hydrogen, alkali metal or an ammonium radical.

As will be apparent from the above equation, acid addition salts of 3-amino-4-ketothiophanes are used as intermediates. These are new compounds but may be prepared by the series of reactions shown in the specific examples.

The compounds of the present invention are prepared by mixing an acid addition salt of a 3-amino-4-ketothiophane with a compound which gives the cyanate ion in solution. Such compounds are the alkali metal cyanates, such as sodium or potassium cyanate, ammonium cyanate, and other salts of cyanic acid.

We prefer to carry out our reaction in aqueous solution, but may use other solvents, such as methanol, ethanol, propanol, dioxane, etc., or mixtures thereof.

The reaction is usually completed within a very short time, i. e., within a matter of minutes, when carried out at ordinary room temperature. The reaction can take place at temperatures of from about 0° C. to about 40° C., which obviously will vary the reaction time from that given above.

The compounds of the present invention are useful principally as intermediates in the preparation of other useful organic compounds and pharmaceuticals, such as biotin.

2

Our invention will now be illustrated in greater particularity by means of the following specific examples. Different reaction conditions and intermediates may be employed without departing from the scope of the invention as defined by the appended claims.

Example 1

To a stirred mixture of 3.4 g. of hippuric acid, 1.6 g. of anhydrous sodium acetate and 11.6 g. of acetic anhydride was added, during fifteen minutes, 30 g. of ethyl δ-formylvalerate. The resulting mixture was heated at 60° C. for three hours with stirring, then poured into iced water. The oil which separated was extracted with ether, the ether solution was dried and evaporated. The residue, an orange-red oil, contained the azlactone of 2-benzoylamino-7-carbethoxy-2-heptenoic acid.

A solution of 6.6 g. of the azlactone of 2-benzoylamino-7-carbethoxy-2-heptenoic acid and 2.6 cc. ethylthioglycolate in 33 cc. of dry ethanol was treated with 0.1 cc. of piperidine and refluxed one-half hour. Then an additional 0.1 cc. of piperidine was added and the solution was refluxed one-half hour longer. Upon evaporation to dryness, 7.5 g. of an oil was obtained. A mixture of the oil, 30 cc. dry ethanol, 2.6 cc. ethylthioglycolate and 0.2 cc. piperidine was refluxed two and one-half hours, then evaporated to dryness. The yield of ethyl δ-benzoyl-amino-β-(carbethoxymethylthio) suberate was 7.3 g., obtained as an oil.

To the dry sodium ethoxide from 1.3 g. of sodium obtained by evaporating the alcoholic solution to dryness, was added in a nitrogen atmosphere 2.8 cc. of ethylthioglycolate in 25 cc. of benzene, followed by 7.3 g. of crude ethyl δ-benzoyl-amino-β-(carbethoxymethylthio)-suberate in 35 cc. benzene. The mixture was protected from moisture and refluxed for two and one-half hours. It was then cooled, diluted with ether, washed twice with iced water and with 3% sodium hydroxide. The combined aqueous washings were acidified with acetic acid, the mixture was extracted with ether, the ether layer was washed in succession with water, sodium bicarbonate and water, and finally evaporated to dryness in vacuo. The product, 2-δ-carbethoxybutyl-3-benzoylamino-4-keto-5-carbethoxy-thiophane, was obtained as an oil.

A mixture of 3.1 g. of the compound obtained immediately above, 20 cc. acetic acid and 20 cc. of 6 N hydrochloric acid was refluxed for five and one-half hours. A total of 20 cc. 12 N hydrochloric acid was added in five portions during the first three hours. The mixture was cooled to 5° C. and filtered. The filtrate was diluted with an equal volume of water and extracted thoroughly with ether. The aqueous layer was evaporated to dryness. The crystalline residue was dissolved in 30 cc. water, treated with Norit and filtered. The filtrate was evaporated to dryness. The colorless, crystalline residue consisted of 1.1 g. of 2-δ-carboxybutyl-3-amino-4-ketothiophane hydrochloride.

To a solution of 1.1 g. of the above hydrochloride in 10 cc. water was added a solution of 0.70 g. potassium cyanate in 5 cc. water. A nearly colorless crystalline substance separated. This was filtered, washed and dried. A yield of 0.70 g. of 2-δ-carboxybutyl-5-keto-2,4,6,8-tetrahydroimidazolo-[4,5-c] thiophene was obtained.

In the above example, R of the general equation is a carboxybutyl radical. R can be other carboxyalkyl radicals, such as carboxymethyl, carboxyethyl, carboxypropyl, carboxyisopropyl, carboxyamyl, carboxyhexyl, etc. When an acid addition salt of 3-amino-4-ketothiophane, in which R is a carbalkoxyalkyl radical, is used as an intermediate, we can prepare 5-keto-2,4,6,8-tetrahydroimidazolo-[4,5-c] thiophenes in which R will be a carbethoxybutyl, carbethoxypropyl, carbethoxyethyl, carbethoxymethyl, carbomethoxybutyl, carbomethoxypropyl, carbomethoxyethyl, carbomethoxymethyl, carbomethoxyamyl, or similar radical.

In the above example, the intermediate used was the hydrochloride of a 3-amino-4-ketothiophane. We can use other acid addition salts in place of the hydrochloride, such as the sulfate, phosphate, nitrate, hydrobromide, and the like.

*Example 2*

A mixture of 2.9 g. α-benzoylaminocrotonoazlactone (Carter, Handler and Melville, J. Biol. Chem., 129, 368 (1939)), 2.1 g. ethylthioglycolate and 25 cc. dry ethanol was treated with four drops piperidine. Slight warming occurred and a clear solution resulted. After seventeen hours at 25° C., the solution was evaporated to dryness in vacuo. The desired ester, ethyl-α-benzoylamino-β-(carbethoxymethylthio)-butyrate, weight 5.1 g., was obtained in the form of a light brown oil.

To the dry sodium ethoxide prepared from 0.16 g. sodium and 10 cc. dry ethanol was added, under a nitrogen atmosphere, 15 cc. benzene, followed by a solution of 1.26 g. of the ester prepared above in 25 cc. benzene. The mixture was refluxed two hours, cooled to 0° C., diluted with a little ether and extracted several times with iced water. The aqueous washings were added immediately to excess, cold dilute acetic acid. Sodium chloride was added and the oil was extracted with ether. The ether solution was washed with water, dried with magnesium sulfate, and evaporated. The yield of 2-methyl-3-benzoylamino-4-keto-5-carbethoxythiophane was 0.85 g., obtained as an orange-yellow gum.

A mixture of 1.0 g. of the compound prepared immediately above and 11 cc. 6 N hydrochloric acid was heated on a steam-bath for fifteen and one-half hours. Water was added to the mixture and the gummy material was removed by washing several times with ether. The aqueous layer was treated with Norit, and the filtrate was evaporated to dryness. The residue was dissolved in dry ethanol, the solution was treated with Norit, filtered, and the filtrate was evaporated to dryness. The residue consisted of 0.25 g. of 2-methyl-3-amino-4-ketothiophane hydrochloride.

A solution of 200 mg. of the amino ketothiophane above in 3 cc. water was treated with 200 mg. potassium cyanate. A clear solution resulted at first, followed by separation of colorless crystals. The latter were filtered and washed with 1 cc. water. The yield of 2-methyl-5-keto-2,4,6,8-tetrahydro imidazolo [4,5-c] thiophene was 55 mg.

In the above example, R of the general equation is methyl. We can use as intermediates other acid addition salts of 3-amino-4-ketothiophane in which R is an alkyl radical such as ethyl, propyl, isopropyl, butyl, isobutyl, amyl, isoamyl, and the like.

We claim:

1. Compounds having the formula:

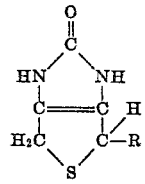

wherein R is a member of the group consisting of alkyl radicals, carboxyalkyl radicals and carbalkoxyalkyl radicals.

2. 2 - carboxybutyl - 5 - keto - 2,4,6,8 - tetra - hydroimidazolo-[4,5-c] thiophene.

3. 2 - methyl - 5 - keto - 2,4,6,8 - tetrahydro - imidazolo-[4,5-c] thiophene.

4. 2 - carbomethoxy - 5 - keto - 2,4,6,8 - tetra - hydroimidazolo-[4,5-c] thiophene.

5. A method preparing 5-keto-2,4,6,8-tetrahydroimidazolo-[4,5-c] thiophenes having the formula:

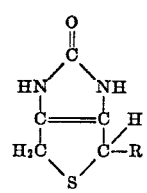

wherein R is a member of the group consisting of alkyl radicals, carboxyalkyl radicals and carbalkoxyalkyl radicals, which comprises mixing an acid addition salt of a compound having the formula:

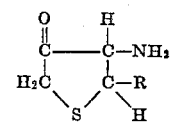

wherein R is as above with a member of the group consisting of cyanic acid and salts of cyanic acid.

6. A method of preparing 5-keto-2,4,6,8-tetrahydroimidazolo-[4,5-c] thiophenes having the formula:

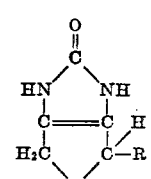

wherein R is a member of the group consisting of alkyl radicals, carboxyalkyl radicals, and carbalkoxyalkyl radicals, which comprises mixing a compound having the formula:

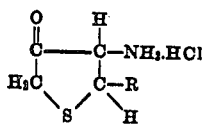

wherein R is as above, with potassium cyanate.

7. A method of preparing 2-carboxybutyl-5-keto - 2,4,6,8 - tertahydroimidazolo - [4,5 - c] thiophene which comprises mixing 2-carboxybutyl-3-amino-4-ketothiophane hydrochloride with potassium cyanate.

8. A method of preparing 2-methyl-5-keto-2,4,6,8-tetrahydroimidazolo - [4,5 - c] thiophene which comprises mixing 2-methyl-3-amino-4-ketothiophane hydrochloride with potassium cyanate.

9. A method of preparing 2-carbomethoxy-5-keto - 2,4,6,8 - tetrahydroimidazolo - [4,5 - c] thiophene which comprises mixing 2-carbomethoxy-3-amino - 4 - ketothiophane hydrochloride with potassium cyanate.

SEYMOUR BERNSTEIN.
BERNARD R. BAKER.
SIDNEY R. SAFIR.